United States Patent

Morgan

[11] Patent Number: 5,845,191
[45] Date of Patent: Dec. 1, 1998

[54] METHOD FOR ASYMMETRICALLY ATTENUATING SIGNALS IN A TRANSMISSION SYSTEM

[75] Inventor: Isaac E. Morgan, Stone Mountain, Ga.

[73] Assignee: AT&T Corp, Middletown, N.J.

[21] Appl. No.: 686,302

[22] Filed: Jul. 25, 1996

[51] Int. Cl.$^6$ .................................................. H04N 7/173
[52] U.S. Cl. ............................ 455/5.1; 455/3.1; 348/12; 348/6
[58] Field of Search ................................. 348/4, 6, 7, 8, 348/10, 11, 12, 13; 455/3.1, 4.2, 5.1, 6.1, 6.2, 6.3; 333/28 R, 81 R, 81 A; H04N 7/16, 7/173

[56] References Cited

U.S. PATENT DOCUMENTS

| | | | |
|---|---|---|---|
| 4,520,508 | 5/1985 | Reichert, Jr. ............................ | 348/11 |
| 4,633,202 | 12/1986 | Basile et al. ............................ | 455/5.1 |
| 4,982,440 | 1/1991 | Dufresne et al. ........................ | 348/12 |
| 5,408,259 | 4/1995 | Warwick .................................. | 348/6 |
| 5,581,801 | 12/1996 | Spriester et al. ........................ | 455/3.3 |

*Primary Examiner*—Chris Grant
*Attorney, Agent, or Firm*—Robert B. Levy

[57] ABSTRACT

Ingress noise in a hybrid fiber-coax transmission system (10) may be reduced by employing asymmetric taps (30$_1$'–30$_8$',) between a pair of line extenders (28—28) for attenuating downstream and upstream information by different weights. The downstream weights of the taps are selected to achieve a substantial constant power level at each tap for individual subscribers (14—14). The upstream attenuation of each tap is selected to allow for a nearly constant level of subscriber-generated information to be received at the line extender while the subscriber generated upstream information is supplied to the taps at a constant value that is maximized to reduce the effect of ingress noise.

8 Claims, 6 Drawing Sheets

FIG. 2 (PRIOR ART – DOWNSTREAM)

FIG. 3 (PRIOR ART — UPSTREAM)

5,845,191

METHOD FOR ASYMMETRICALLY ATTENUATING SIGNALS IN A TRANSMISSION SYSTEM

TECHNICAL FIELD

This invention relates to a technique for attenuating downstream and upstream signals in a hybrid fiber-coax system by different weights to reduce ingress noise.

BACKGROUND ART

In present day hybrid fiber-coax transmission systems, downstream information destined for individual subscribers originates at a head end. From the head end, the downstream information is typically optically formatted for transmission over a fiber optic link to a fiber node at which the information is then converted to an electrical signal. A coaxial cable network (plant) transmits the electrical signal to the individual subscribers and carries upstream signals from the subscribers to the fiber node for ultimate delivery to the head end.

Within the coaxial cable plant, the downstream electrical signal is typically amplified by one or more trunk amplifiers and one or more line extenders before distribution via taps to subscriber premises. (Upstream signals are similarly amplified by upstream trunk amplifiers and line extenders.) The power of the downstream signal received at each premises is reduced by the loss in the cable as well as the inherent power splitting at each tap. For example, a tap serving two homes will split the power 2:1 whereas a tap serving four homes would split the power 4:1. To achieve an adequate power level at each premises, the tap weight, (i.e., the level of attenuation provided by each tap) is selected to obtain approximately the same loss at all homes. Hence, the tap weights must decrease in accordance with the distance that the downstream signal traverses from the downstream amplifiers and line extenders because of increasing cable losses plus the decreased power level caused by the energy siphoned off at previous taps. Equal losses, and therefore, equal received power levels for each home assures a sufficiently high signal to overcome any noise that may be present in the home.

In present day hybrid fiber coax systems, the taps have symmetric losses. In other words, downstream signals that pass to the subscriber premises are attenuated by each tap to same degree (except for small variations due to their different frequency) as upstream signals received at each tap from the subscriber premises. Just as it is desirable to achieve a uniform signal level for downstream signals at the subscriber premises, it is also desirable to achieve a uniform level for upstream signals received at each upstream amplifier in the cable plant. Since the tap weights are fixed, the level of signals emanating from the customer premises equipment (CPE) at the subscribers' premises must be varied to assure that the received upstream signals all have approximately the same level at a common upstream amplifier. Hence, the subscriber premises closest to the upstream amplifier must have the highest CPE output level to compensate for the highest tap value. Conversely, the subscriber premises furthest from the upstream amplifier generally will have the lowest signal level. In practice, the tap weights vary in 3 dB increments. Thus, the actual signal levels received at various subscriber premises may vary somewhat from a uniform desired level.

The use of present day symmetric taps incurs a difficulty associated with ingress noise from each subscriber premises and its associated cable drop though which the premises is connected to the cable plant. Noise entering the tap most distant from the upstream amplifier has a much greater effect on performance because of the low loss associated with this distant tap. At the same time, the level of the subscriber-generated CPE output signal entering the most distant tap is lower than the more closer taps, making its signal to noise ratio lower.

Thus, there is a need for a technique for reducing ingress noise in a hybrid fiber-coax system.

BRIEF SUMMARY OF THE INVENTION

Briefly, in accordance with the invention, a technique is provided for transmitting downstream signals through a cable distribution network to a plurality of subscribers and for transmitting upstream signals from the subscribers through the distribution network with reduced ingress noise. The downstream signals are distributed to individual subscribers through taps that are arranged in cascade fashion along at least one cable in the network with each successive tap generally having a smaller downstream attenuation weight that its upstream neighbor for attenuating downstream signals. Upstream signals are generated by subscribers at a substantially equal power level and pass via the taps to the distribution network. The taps, in the aggregate, attenuate upstream signal received by an amount different than the aggregate attenuation provided by the taps for downstream signals. The attenuation provided by each of the taps is adjusted so that the level of upstream signals received at each upstream amplifier in the distribution network are substantially equal, thereby minimizing the effects of ingress noise. This method results in uniformly high transmit levels from all subscribers and increased attenuation to ingress noise from distant subscribers.

DETAILED DESCRIPTION

Figure 1:
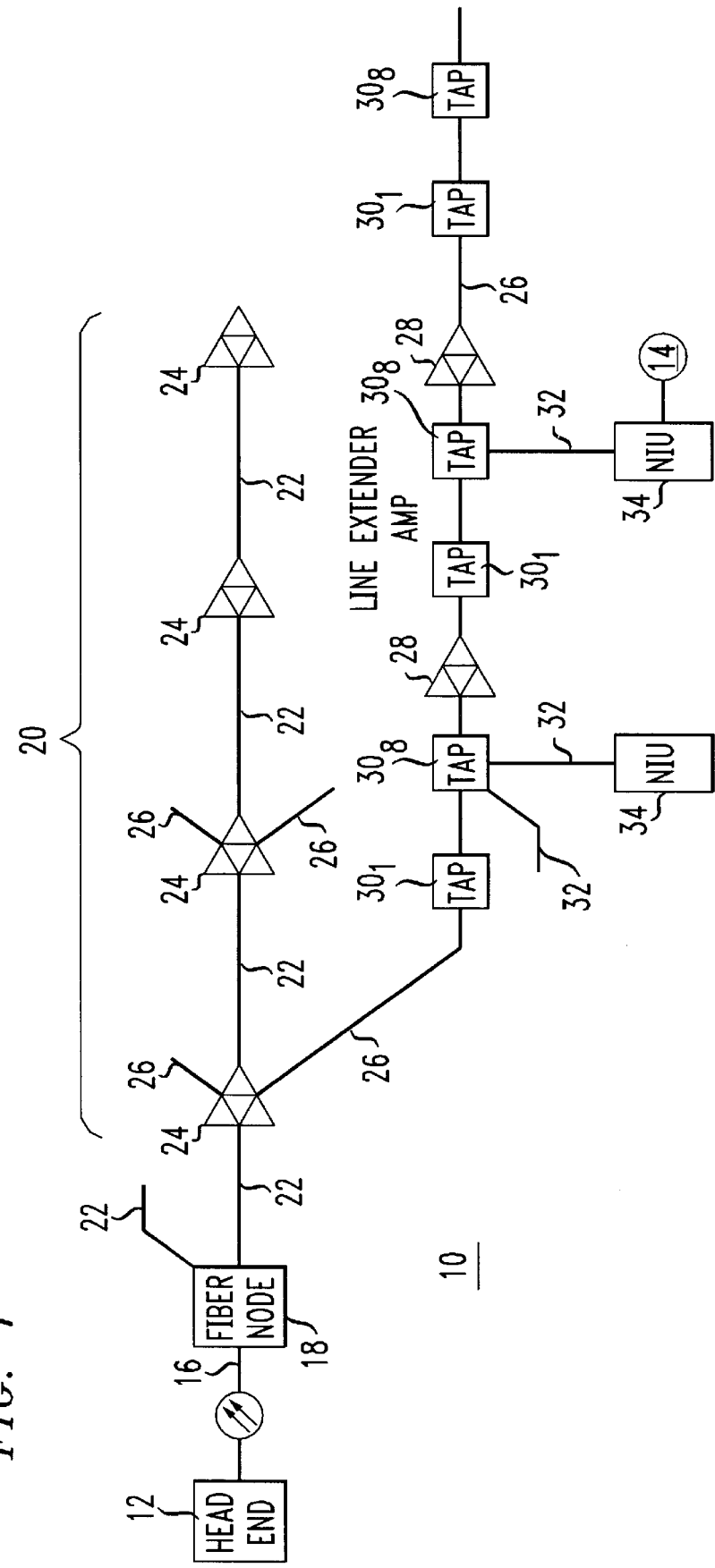
FIG. 1 is a block diagram of a hybrid fiber-coax transmission system in accordance with the prior art.

FIG. 1 depicts a hybrid-fiber-coax transmission system 10 in accordance with the prior art. The system 10 includes a head end 12 for generating information, e.g., video, audio, multimedia, data and/or text ("downstream information") for transmission to individual subscribers 14—14. The head end 12 also receives information, ("upstream information"); e.g., video, audio, multimedia, data and/or text; generated by one or more of the subscribers 14—14.

In practice, a combination of optical fibers and coaxial cables carry the downstream information from the head end 12 to the subscribers 14—14 and carry the upstream information from the subscribers to the head end. As seen in FIG.

1, an optical fiber link 16, comprised of an upstream and down stream fibers (not shown), carries both the upstream and downstream information in an optical format between the head end 12 and a fiber node 18. The fiber node 18 converts the optically-formatted downstream information received from the head end 12 into electrical signals for distribution via a coaxial cable distribution network 20 to the individual subscribers 14—14. Further, the fiber node 18 converts upstream information, received from subscribers 14—14 via the coaxial cable distribution network 20, into an optically-formatted signal for transmission to the head end 12. Note that upstream and downstream signals could pass electrically between the head end 12 and the network 20 via coaxial cable, rather be optically formatted for passage via the fiber optic link 16.

The cable distribution network 20 has a tree and branch architecture and typically includes at least one, and typically four coaxial trunk cables 22—22 (only one shown). Each of the trunk cables 22—22 typically has at a plurality of branching trunk amplifiers 24—24 cascaded along its length for amplifying the upstream and downstream information. (In practice, each branching trunk amplifiers is comprised of individual amplifying elements and diplexers (not shown) that separately amplify the upstream and downstream information.)

Each branching trunk amplifier 24 feeds one or more distribution cables 26—26. Each distribution cable 26 typically has one or more line extenders 28—28 cascaded along its length for amplifying the upstream and downstream information carried by each distribution cable. Each distribution cable 26 contains a plurality of taps $30_1$–$30_8$ disposed in cascaded fashion between pairs of line extenders 28—28 (only the taps $30_1$ and $30_8$ are shown in FIG. 1.) It should be understood that a greater or smaller number of taps may be present. The taps couple the distribution cable 26 to a plurality of subscribers 14—14 via individual coaxial drop cables 32—32 that each connect a subscriber to a tap via a separate one of network interface units (NIU) 34—34.

Figure 2:
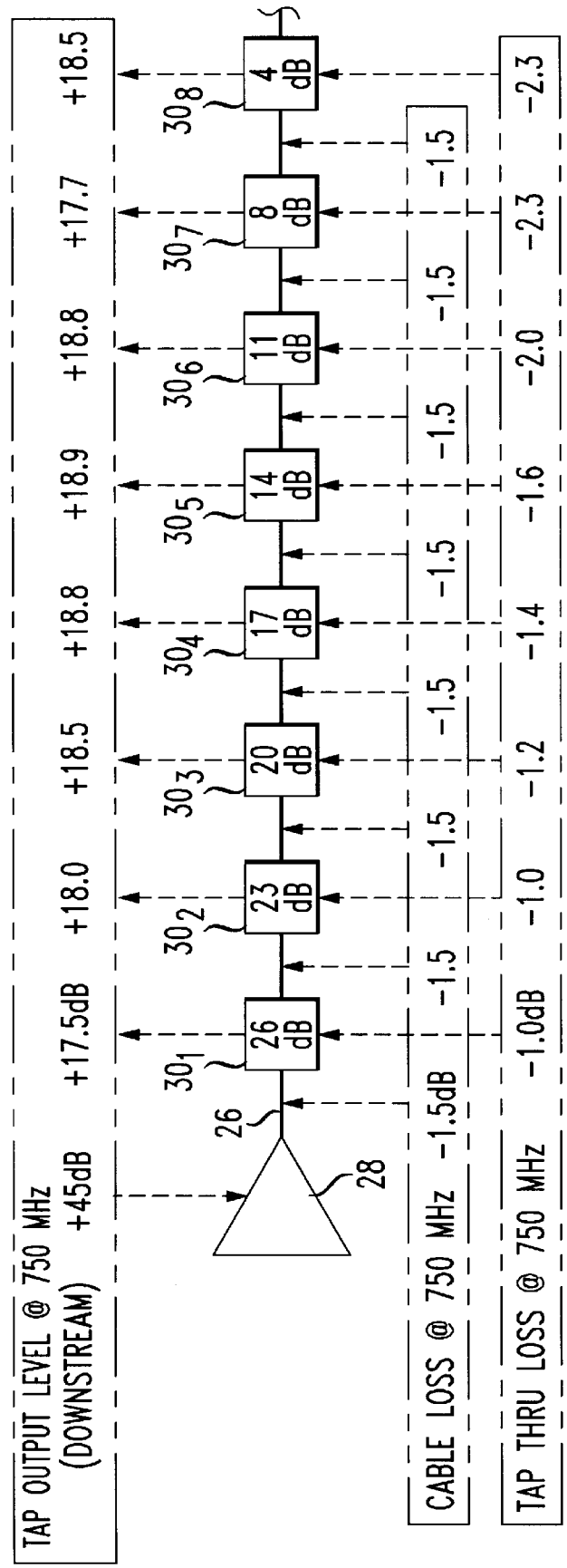
FIG. 2 depicts a portion of the transmission system of FIG. 1, showing the downstream attenuation weights of each of a set of taps within the system.

FIG. 2 depicts a portion of a distribution cable 26 of the network 10, showing a string of cascaded taps $30_1$–$30_8$ that successively attenuate the signal generated by a first of a pair of downstream line extenders 28—28 (only one shown). The weights (i.e., attenuation) of the taps $30_1$–$30_8$ generally successively decrease in accordance with the distance of the tap from the line extender 28 in FIG. 2. Thus, the tap $30_1$, which is closest to the line extender 28, has a weight significantly greater than the weight of the tap $30_8$ which is furthest from the line extender.

The tap weights are chosen to successively decrease as a function of the distance of the tap from the line extender 28 to assure a substantially uniform output level at each tap. There are several factors that influence the selection of tap weights. The branch distribution cable 26 along which the taps $30_1$–$30_8$ of FIG. 8 are cascaded has a certain loss per unit length. Thus, to assure approximately the same received level at the upstream line extender from each of the taps $30_1$–$30_8$, it follows that the tap $30_8$ must have a smaller weight than the tap $30_1$.

Moreover, each of the taps $30_1$–$30_8$ has a certain loss associated with the passage of signals therethrough. Since the taps $30_1$–$30_8$ are cascaded, the aggregate tap loss, as measured at the tap $30_8$, will be sum of the losses of the signals through the preceding taps. For this reason as well, the weight of the tap $30_8$ must be less than the weight of the tap $30_1$.

Figure 3:
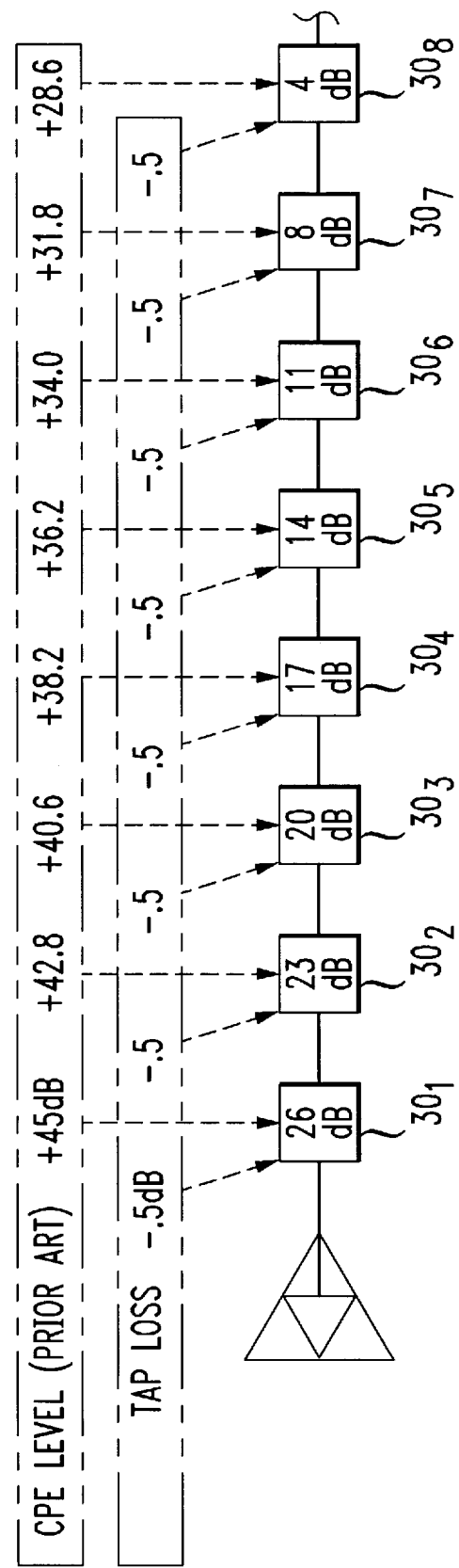
FIG. 3 depicts the same portion of the transmission system as in FIG. 2, indicating the upstream attenuation weights for the taps.

In the illustrated embodiment of FIG. 3, the loss of the distribution cable 26 at 750 MHz is assumed to be −1.5 dB between successive pairs of the taps $30_1$–$30_8$ which are presumed to be equally spaced. Further, the taps $30_1$–$30_8$ are presumed to have through-losses as indicated by values depicted in FIG. 2. Under these conditions, a tap output level of approximately 18±0.1 dB for each subscriber 14—14 can be achieved for an line extender 28 output value of +45 dB by selecting the tap weights as indicated in Table I.

TABLE I

| Tap No. | Tap Weight |
|---------|------------|
| $30_1$  | 26 dB      |
| $30_2$  | 23 dB      |
| $30_3$  | 20 dB      |
| $30_4$  | 17 dB      |
| $30_5$  | 14 dB      |
| $30_6$  | 11 dB      |
| $30_7$  | 8 dB       |
| $30_8$  | 4 dB       |

The prior art taps $30_1$–$30_8$ are symmetric in terms of the attenuation each provides to upstream and downstream signals. In other words, each tap attenuates upstream and downstream signals by the same weight. Since the taps are symmetric in terms of their attenuation, achieving a substantially constant level for upstream signals received at the line extender 28 requires that the level of upstream signals provided by the subscribers be successively smaller for distant taps. This may understood by reference to FIG. 3 which depicts the upstream weights of the cascaded taps $30_1$–$30_8$. Assuming that the taps $30_1$–$30_8$ of FIG. 3 have upstream weights as given in Table I, then, in order to achieve a substantially constant upstream signal level at the line extender 28 for the cable and tap losses previously with respect to Table I, the CPE level of signals input to each of the taps $30_1$–$30_8$ must be chosen as indicated in Table II

TABLE II

| Tap No. | CPE Input Level |
|---------|-----------------|
| $30_1$  | 45 dB           |
| $30_2$  | 42.8 dB         |
| $30_3$  | 40.6 dB         |
| $30_4$  | 38.4 dB         |
| $30_5$  | 36.2 dB         |
| $30_6$  | 34.0 dB         |
| $30_7$  | 31.8 dB         |
| $30_8$  | 28.6 dB         |

As may be appreciated from Table II, the CPE level input to the distant-most tap $30_8$ is lower, because of its relatively low weight, as compared to the CPE level required at the tap $30_1$ that is closest to the line extender 28.

The present-day approach of employing symmetric taps $30_1$–$30_8$ incurs a difficulty with respect to ingress noise at the premises of each subscriber 14 (FIG. 1) as well as the associated drop cable 32 (FIG. 1). Noise entering a distant tap, such as tap $30_8$ of FIGS. 2 and 3, will have a much greater influence on overall system performance because the weight of that distant tap is relatively small. Conversely, the level of the CPE signal input to such a distant tap is low. Thus, ingress noise will have a greater impact for this reason as well.

In accordance with the invention, the problem of ingress noise can be reduced by making each tap asymmetric such that the weight of each tap is different for upstream and downstream signals. As will be discussed in greater detail below, making each tap asymmetric enables the CPE values input to the taps to be held at a relatively high constant value, thereby minimizing the effects of ingress noise.

Figure 4:
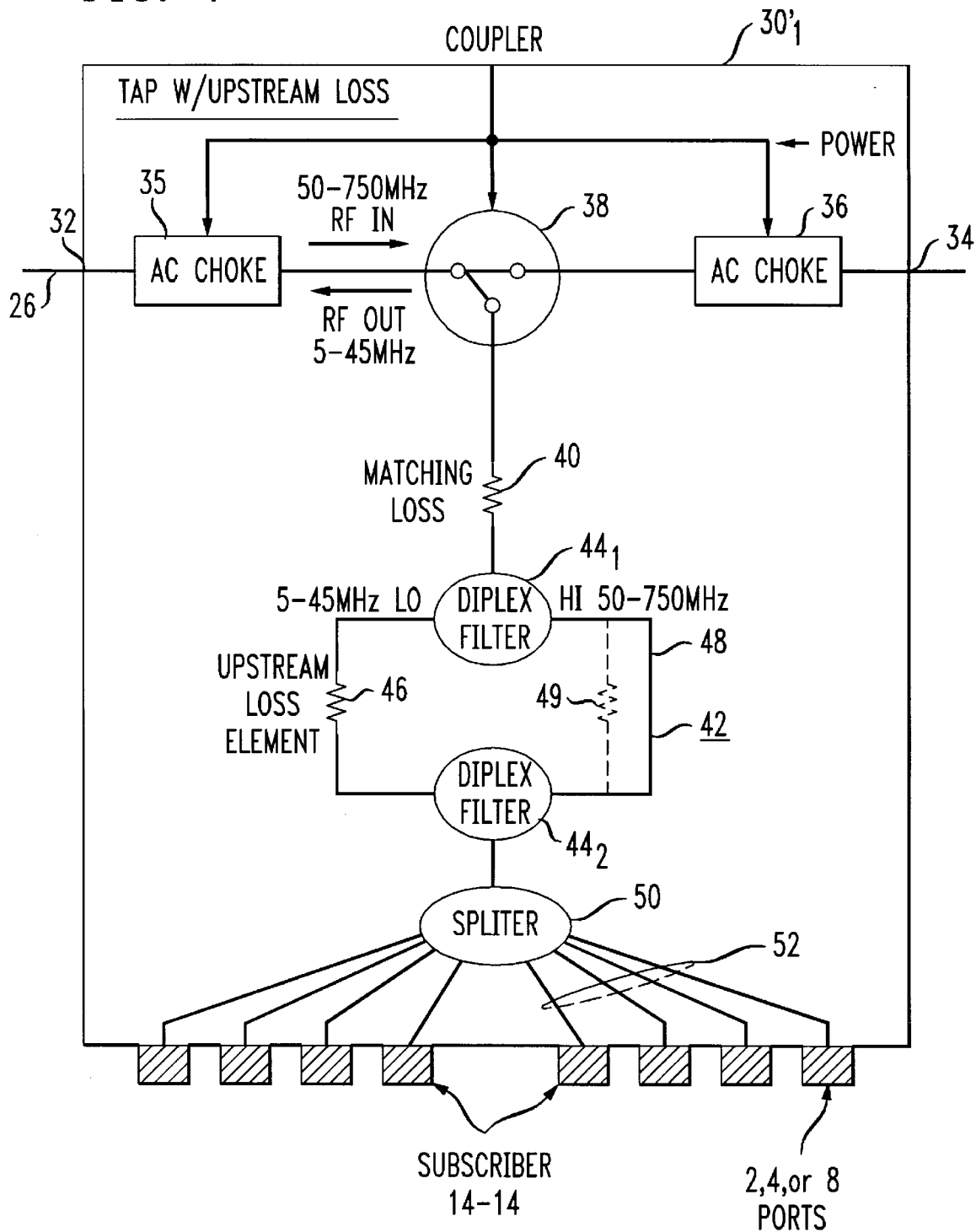
FIG. 4 is a block diagram of an asymmetric through tap in accordance with the invention.

FIG. 4 illustrates an asymmetric through tap $30_1'$ in accordance with the invention for substitution in place of the tap $30_1$ of FIG. 1. (Other asymmetric through taps, each of a construction similar to the tap $30_1'$, would be substituted for the taps $30_1$–$30_8$ of FIGS. 1–3). The asymmetric tap $30_1'$ of FIG. 4 is referred to as a through tap because it functions to attenuate signals passing between a pair of tap ports 32 and 34, respectively, in contrast to a terminating tap, as further described with respect to FIG. 5, that terminates signals.

Referring to FIG. 4, high frequency signals originating at the head end 12 of FIG. 1 enter the tap $30_1'$ at the port 32 and exit via the port 34, whereas low frequency signals from a downstream tap enter via port 34 and exit via port 32. A pair of AC chokes 35 and 36 are serially coupled between the tap ports 32 and 34, respectively for filtering low frequency power signals that share the distribution cable 26. A coupler 38 is interposed between the chokes 35 and 36 and serves to draw off a small portion the high frequency downstream signals entering the tap via port 32 to provide such signals to one of more subscribers premises 14—14. Further, the coupler 38 also serves to inject low frequency signals onto the cable 26 for passage to the head end 12 of FIG. 1. The coupler 38 is generally directional so that upstream signals that enter the coupler pass to the distribution cable 26 but are substantially attenuated in the direction away from the head end.

A matching loss element 40 couples the coupler 38 to a filter assembly 42 comprised of an upstream and downstream diplex filters $44_1$ and $44_2$. The diplex filters $44_1$ and $44_2$ serve to separate high frequency (50–750 MHz) downstream signals along a high frequency path (H) and low frequency (5–45 MHz) upstream signals along a low frequency path (L). The low frequency path of the diplex filter $44_1$ is coupled via an upstream loss element 46 to the low frequency path of the diplex filter $44_2$. In contrast, the high frequency paths of the diplex filter $44_1$ and $44_2$ are linked by a substantially lossless conductor 48.

High frequency downstream signals drawn by the coupler 38 from the distribution cable 26 pass via the matching loss element 40 to the upstream diplex filter $44_1$. The high frequency downstream signals are separated by the diplex filter $44_1$ and pass along its high frequency path to the downstream diplex filter $44_2$ via the conductor 48. The high frequency downstream received at the downstream diplex filter $44_2$ are split equally by a splitter 50 for distribution to one or more subscriber at subscriber tap ports 52—52. As may be appreciated, the high frequency downstream signals drawn from the distribution cable 26 and output at the tap ports 52—52 are attenuated in accordance with the weight (impedance) of the matching loss value 40 (as well as by any parasitic losses in the coupler 38 and the diplex filters $44_1$ and $44_2$).

Low frequency upstream signals received at the tap ports 52—52 are separated by the downstream diplex filter $44_2$ and pass along the filter's low frequency path via the upstream loss element to the diplex filter $44_1$ and from that filter to the coupler 38 via the loss element 46. As may be appreciated, the upstream low frequency signals are thus attenuated by both the upstream and matching loss elements 46 and 40, respectively, (as well as by any parasitic losses in the coupler 38 and the diplex filters $44_1$ and $44_2$). The upstream attenuation achieved by the tap $30_1$ will thus be at least as great, if not greater than the downstream loss and can be independently adjusted by varying the value of the upstream loss element 46. Should it be desirable for the asymmetric tap $30_1'$ of FIG. 4 to provide greater downstream attenuation than upstream attenuation, then a downstream loss element 49 (shown in phantom) could be substituted for the conductor 48.

Figure 5:
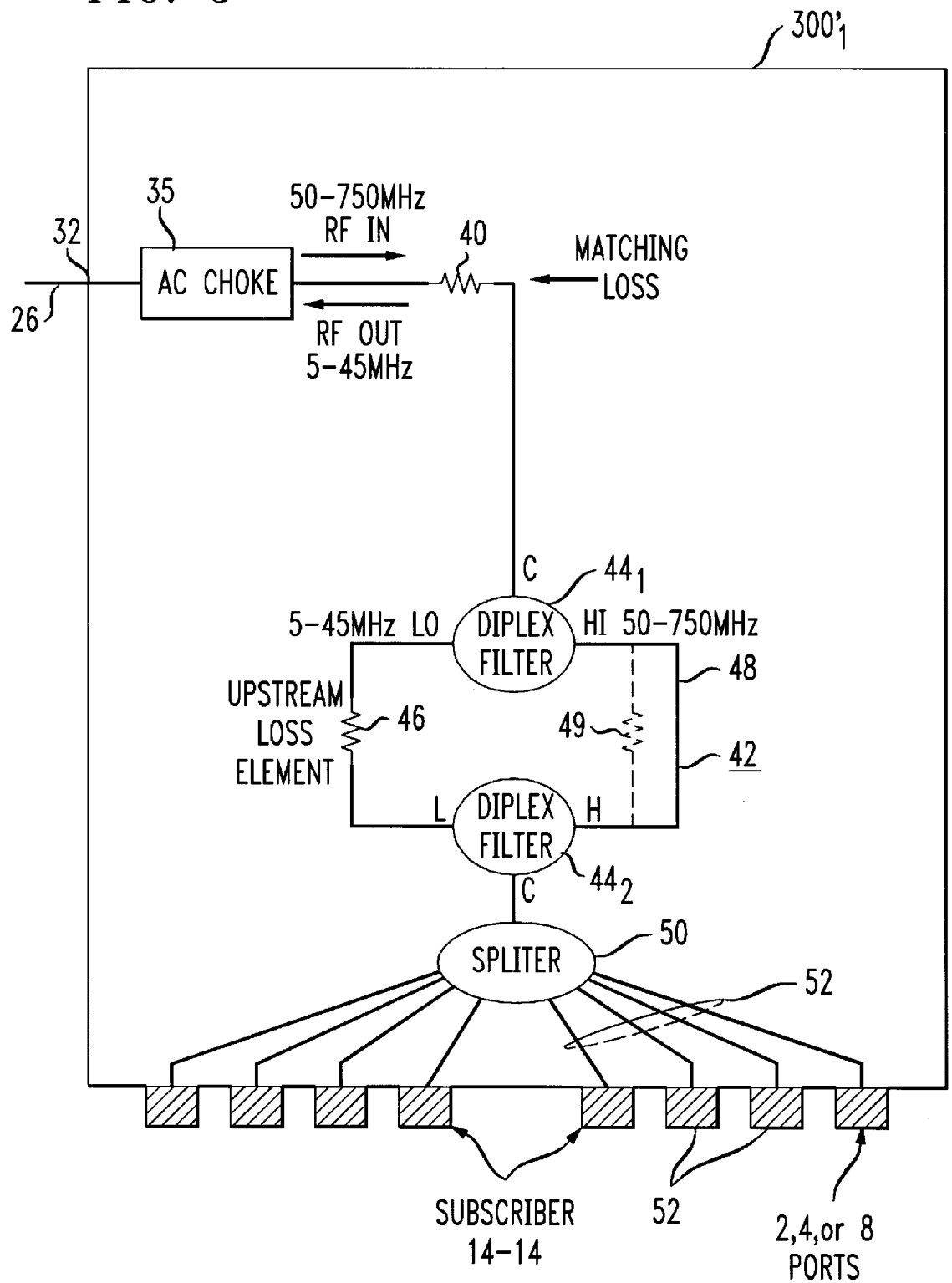
FIG. 5 is a block schematic diagram of an asymmetric terminating tap in accordance with the invention.

In some instances, it is desirable for the asymmetric tap to terminate the distribution cable 26, rather than pass signals therealong. FIG. 5 shows a block schematic diagram of an asymmetric terminating tap 300' in accordance with the invention. The asymmetric terminating tap $300_1'$ of FIG. 5 is similar to the through tap $30_1'$ and like numbers have been used to identify like elements. The major difference between the terminating and through taps $300_1'$ and $30_1'$ of FIGS. 4 and 5, respectively, is that the terminating tap has a single port 32 and a single AC choke 35 coupled directly via the matching loss element 40 to the diplex filter assembly 42. In this way, the matching loss element 40 in the asymmetric through tap $300_1'$ terminates the distribution cable 26 of FIG. 5.

With regard to the construction of the asymmetric through and terminating taps $30_1'$ and $300_1'$ of FIGS. 4 and 5, other variants are possible. In the illustrated embodiments of FIGS. 4 and 5, the asymmetric through and terminating taps $30_1'$ and $300_1'$, respectively, are configured of passive elements to reduce cost and space requirements. The asymmetric through and terminating taps $30_1'$ and $300_1'$ could easily be implemented via active circuits to achieve lower losses or increased gain, as well as isolation between ports. Whether the asymmetric through and terminating taps $30_1'$ and $300_1'$ are configured of active or passive elements, the taps, in combination, have unequal upstream and downstream weights. Directional couplers could also be used to allow for the creation of asymmetric tap losses in the upstream and downstream directions.

The ability of the asymmetric through and terminating taps $30_1'$ and $300_1'$ to provide different upstream and downstream weights can be advantageously employed to reduce ingress noise. This may be appreciated by reference to FIG. 6 that depicts a string of cascaded asymmetric through taps $30_1'$–$30_8'$ substituted for the string of symmetric taps $30_1$–$30_8$ of FIGS. 2 and 3. The ability of the asymmetric taps $30_1'$–$30_8'$ of FIG. 6 to provide different upstream and downstream weights allows the string of taps to have their upstream weights set to permit a constant subscriber CPE level (say +45 dB) input to each tap, and yet achieve a substantially constant upstream signal level at the input to the line extender 28. The advantage of setting the CPE levels of the upstream information supplied to the taps at a constant level allows the CPE level to be maximized for all subscribers, greatly reducing the effect of ingress noise, especially for distant subscribers. As indicated previously, with prior art symmetrical taps, the CPE levels from subscribers must be varied so that the most distant tap transmits the lowest CPE level.

For the embodiment illustrated in FIG. 6, the downstream and upstream weights for each of i taps (where i is an integer) will be given by the relationships:

Downstream tap weight=Line extender 28 level–Desired CPE receive signal–Cum Cable loss (until the $i^{th}$ tap)–Cum Tap through loss (through the $i^{th}$–1 tap)

Upstream Tap weight=CPE Transmit level–Desired Received Level–Cum Cable loss (until the $i^{th}$ tap)–Cum Tap through loss (through the $i^{th}$–1 tap)

If the cable loss between taps is –0.3 dB and the individual tap loss is –0.5 dB, then to achieve a CPE level at the line extender 28 of approximately 19 dB for a CPE transmit level of +45 dB, the upstream weights for the taps $30_1'$–$30_8'$ will be as indicated in Table III.

TABLE III

| Tap | Downstream Tap Loss | CPE Level at Line Extender 28 | Upstream Tap Loss |
| --- | --- | --- | --- |
| $30_1'$ | 26 dB | 18.7 dB | 26 dB |
| $30_2'$ | 23 dB | 18.9 dB | 25 dB |
| $30_3'$ | 20 dB | 19.1 dB | 24 dB |
| $30_4'$ | 17 dB | 19.3 dB | 23 dB |
| $30_5'$ | 14 dB | 19.5 dB | 22 dB |
| $30_6'$ | 11 dB | 19.7 dB | 21 dB |
| $30_7'$ | 8 dB | 19.9 dB | 20 dB |
| $30_8'$ | 4 dB | 19.1 dB | 20 dB |

Figure 6:
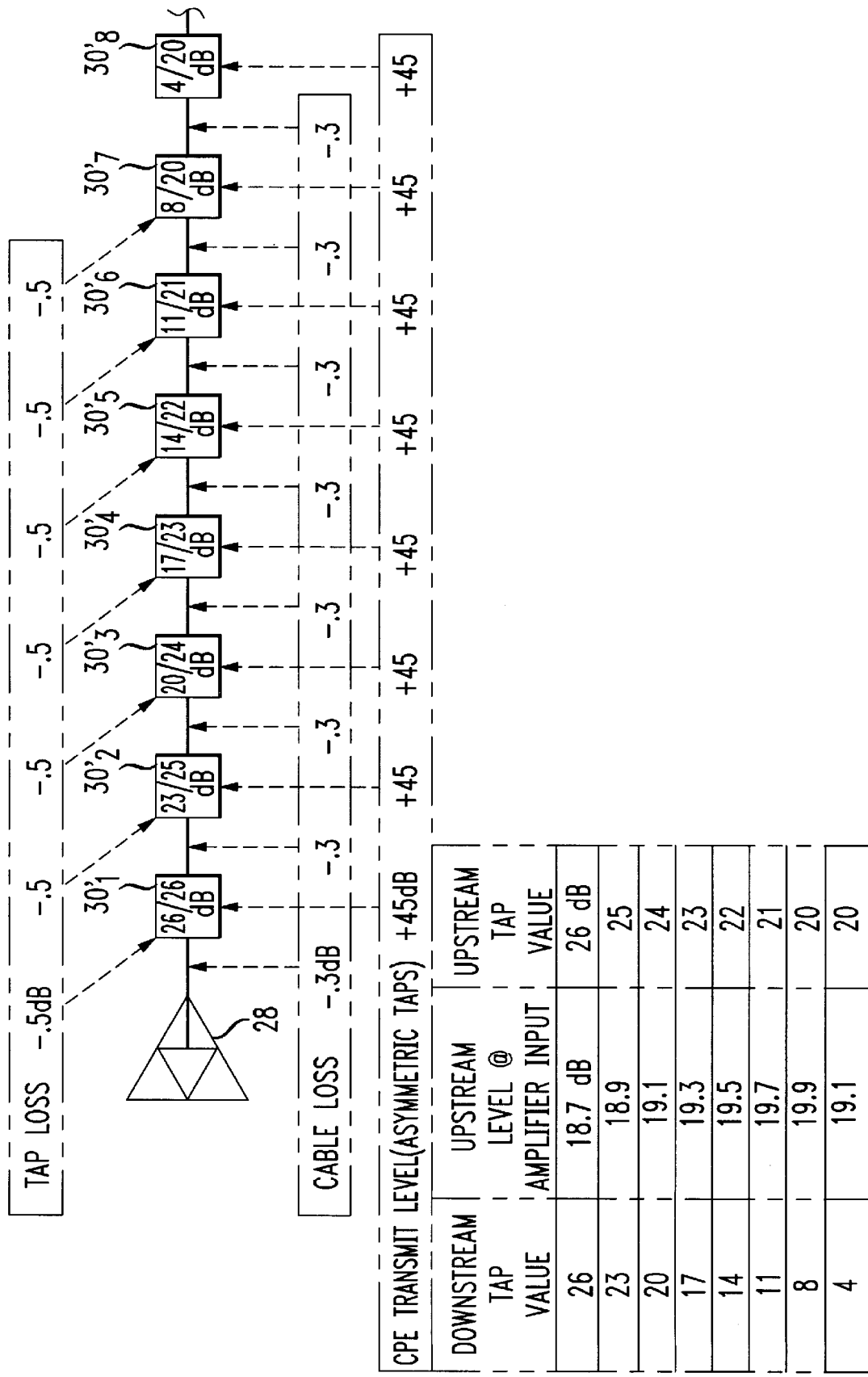
FIG. 6 depicts a modification of the transmission system of FIG. 1 in accordance with a first embodiment of the invention, wherein asymmetrical taps have been substituted for the symmetric taps of FIG. 1.

As compared to the taps $30_1$–$30_8$ of FIGS. 1–3, the taps $30_1'$–$30_8'$ of FIG. 6 have significantly greater upstream weights. Indeed, the upstream weight of each of the taps $30_1'$–$30_8'$ of FIG. 6 is at least as great (and in most instances, greater) than its downstream weight. Providing each of the taps $30_1'$–$30_8'$ with a large upstream weight aids in reducing ingress noise. The large upstream weight of each tap allows it to more effectively block ingress noise than if the tap had a low upstream weight as with the prior art taps $30_1$–$30_8$ of FIGS. 1–3.

The digital signals in an hybrid fiber-coax environment are adversely affected by ingress noise and signal reflections attributable to a lower VSWR. Use of the asymmetric taps in accordance with the invention reduces ingress noise from subscribers while simultaneously reducing reflections by increasing the VSWR in the 5–45 MHz bandwidth on which the upstream signals typically transmitted.

The foregoing describes a transmission system that utilizes asymmetric taps ($30_1'$–$30_8'$) for attenuating upstream information by an amount different than downstream information to allow the upstream information to be transmitted at a constant level, reducing the influence of upstream noise, particularly at distant taps.

It is to be understood that the above-described embodiments are merely illustrative of the principles of the invention. Various modifications and changes may be made thereto by those skilled in the art which will embody the principles of the invention and fall within the spirit and scope thereof.

What is claimed:

1. A method for transmitting a downstream signal through at least one cable in a distribution network to individual subscribers and for transmitting upstream signals from subscribers through the cable, comprising the steps of:

supplying the downstream signal to individual subscribers via a string of taps cascaded along the cable, each tap having a successively decreasing downstream attenuation weight as compared to an upstream neighboring tap for attenuating the downstream signal so that the downstream signal received at a distant most tap has substantially the same signal strength as the downstream signal received at a closest tap; and attenuating, at each tap, the upstream signal from an associated subscriber by an amount such that the taps provide an aggregate upstream attenuation different than an aggregate downstream attenuation, the upstream attenuation of each tap established such that the level of the upstream signal received from said each associated subscriber in the distribution network is substantially equal for all subscribers wherein the upstream attenuation provided by each tap is set by subtracting, from a given subscriber upstream signal level, a desired level for the upstream signal within the distribution network, a cumulative cable loss associated with said tap and cumulative tap losses associated with said taps.

2. The method according to claim 1 wherein the upstream attenuation provided by each tap varies in accordance with the distance of the tap from the distribution network so that a distant most tap has an upstream attenuation less than a closest most tap.

3. The method according to claim 1 wherein a distant most tap attenuates upstream information by an amount more than the downstream information.

4. A method for transmitting downstream information through at least one cable in a distribution network to individual subscribers and for transmitting upstream information from subscribers through the cable, comprising the steps of:

supplying a downstream signal to individual subscribers via a string of taps cascaded along the cable, each tap having a successively decreasing downstream attenuation weight than an upstream neighboring tap for attenuating downstream signals so that the downstream signal received at a distant-most tap has substantially the same signal strength as the downstream signal received at a closest tap; and attenuating, at each tap, the upstream signal by an amount such that the taps provide an aggregate upstream attenuation different than an aggregate downstream attenuation, the upstream attenuation of each tap established such that the level of subscriber generated information received in the distribution network is substantially equal for all subscribers and wherein each tap attenuates downstream information by passing such information through a matching loss element and thereafter filtering such downstream information from received upstream information prior to passing such downstream information to individual subscribers.

5. A method for transmitting downstream information through at least one cable in a distribution network to individual subscribers and for transmitting upstream information from subscribers through the cable, comprising the steps of:

supplying a downstream signal to individual subscribers via a string of taps cascaded along the cable, each tap having a successively decreasing downstream attenuation weight than an upstream neighboring tap for attenuating downstream signals so that the downstream signal received at a distant most tap has substantially the same signal strength as the downstream signal received at a closest tap; and attenuating, at each tap, the upstream signal by an amount such that the taps provide an aggregate upstream attenuation different than an aggregate downstream attenuation, the upstream attenuation of each tap established such that the level of subscriber generated information received in the distribution network is substantially equal for all subscribers and wherein each tap attenuates upstream information received from subscribers by first filtering such information from downstream information, then transmitting such information through an upstream loss element and then through a matching loss element prior to transmission to the cable.

6. A method for transmitting downstream information through at least one cable in a distribution network to individual subscribers and for transmitting upstream information from subscribers through the cable, comprising the steps of:

supplying a downstream signal to individual subscribers via a string of taps cascaded along the cable, each tap having a successively decreasing downstream attenuation weight than an upstream neighboring tap for attenuating downstream signals so that the downstream signal received at a distant most tap has substantially the same signal strength as the downstream signal received at a closest tap; and attenuating, at each tap, the upstream signal by an amount such that the taps provide an aggregate upstream attenuation different than an aggregate downstream attenuation, the upstream attenuation of each tap established such that the level of subscriber generated information received in the distribution network is substantially equal for all subscribers and wherein a closest most tap attenuates the upstream information by an amount approximately the same as the downstream information.

7. A method for establishing an interconnection to a distribution network for transmitting downstream signals to subscribers and for transmitting upstream signals received from subscribers via taps, the method including the step of attenuating, via the taps, downstream and upstream signals by separate selectable attenuation values wherein the upstream attenuation provided by each tap is set by subtracting, from an associated subscriber's upstream signal level, a desired level for that subscriber's upstream signal, a cumulative cable loss associated with said each tap and cumulative tap losses associated with said taps.

8. A method for establishing an interconnection, via successive taps, to a distribution network containing cables and amplifiers for transmitting downstream signals to subscribers and for transmitting upstream signals from subscribers, the method including the step of attenuating, via each tap, an associated subscriber's upstream signal by a selectable attenuation value independent of attenuation of said downstream signals transmitted to said associated subscriber so that the upstream signals received from the taps at an upstream amplifier within the distribution system are substantially equal wherein the upstream attenuation provided by each tap is set by subtracting, from a given subscriber's upstream signal level, a desired level for the subscriber's upstream signal, a cumulative cable loss associated with said each tap and cumulative tap losses associated with said taps.

* * * * *